United States Patent Office 2,970,144
Patented Jan. 31, 1961

2,970,144
ESTERS OF 9-ALKYL-3-OXA AND 3-THIA-9-AZABICYCLO[3.3.1]-NONAN-7-OL

Charles L. Zirkle, Haddon Heights, N.J., assignor to Smith Kline & French Laboratories, Philadelphia, Pa., a corporation of Pennsylvania No Drawing. Filed Dec. 11, 1957, Ser. No. 701,975

10 Claims. (Cl. 260—243)

This invention relates to pharmacologically active esters of 9-alkyl-3-oxa-9-azabicyclo[3.3.1]-nonan-7-ol and 9-alkyl-3-thia-9-azabicyclo[3.3.1]-nonan-7-ol.

The new esters which are the subject of this invention are effective therapeutic agents for the treatment of disorders of the central and autonomic nervous systems. More specifically, these novel compounds have utility as antispasmodics, tranquilizers, anticholinergics, sedatives and antiemetics. In particular, they are potent anti-Parkinsonism drugs.

The novel esters of 9-alkyl-3-oxa and 3-thia-9-azabicyclo[3.3.1]-nonan-7-ol of this invention are represented by the general formula:

FORMULA 1

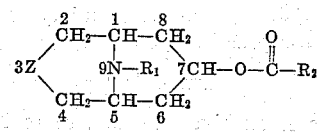

when:

Z represents oxygen or sulfur, $R_1$ represents a straight or branched chain lower alkyl group, preferably containing from 1 to 6 carbon atoms, and $R_2$ represents the following:

Phenyl, thienyl, fluorenyl, biphenyl and xanthenyl;

Substituted phenyl such as methoxy, halogen, preferably chloro or bromo, or amino substituted phenyl;

Substituted fluorenyl such as halogen, preferably chloro or bromo, substituted fluorenyl;

Substituted biphenyl such as carboalkoxy, having 2 to 3 carbon atoms, substituted biphenyl;

Phenylalkyl having 7 to 10 carbon atoms, the alkyl moiety being saturated or unsaturated;

Ring substituted phenylalkyl, the phenylalkyl moiety having 7 to 10 carbon atoms, such as methoxy or halogen, preferably chloro or bromo, ring substituted phenylalkyl, the alkyl moiety being saturated or unsaturated;

Phenyl hydroxyalkyl having 7 to 10 carbon atoms;

Ring substituted phenyl hydroxyalkyl having 7 to 10 carbon atoms such as halogen, preferably chloro or bromo, ring substituted phenyl hydroxyalkyl;

Diphenylalkyl having 13 to 16 carbon atoms;

Ring substituted diphenylalkyl, the diphenylalkyl moiety having 13 to 16 carbon atoms, such as methoxy or halogen, preferably chloro or bromo, ring substituted diphenylalkyl;

Diphenyl hydroxyalkyl having 13 to 16 carbon atoms;

Ring substituted diphenyl hydroxyalkyl, the diphenyl hydroxyalkyl moiety having 13 to 16 carbon atoms, such as methoxy, halogen, perferably chloro or bromo, or methyl ring substituted diphenyl hydroxyalkyl;

Phenyl cyclohexylmethyl;

Ring substituted phenyl cyclohexylmethyl, with the phenyl moiety substituted, having 13 to 16 carbon atoms such as methoxy ring substituted phenyl cyclohexylmethyl;

Phenyl cyclohexyl hydroxyalkyl having 13 to 16 carbon atoms, and

Ring substituted phenyl cyclohexyl hydroxyalkyl, with the phenyl moiety substituted and the phenyl cyclohexyl hydroxyalkyl moiety having 13 to 16 carbon atoms, such as methoxy or halogen, preferably chloro or bromo, ring substituted phenyl cyclohexyl hydroxyalkyl.

Preferred compounds of this invention are represented by the above structural formula when:

Z represents oxygen or sulfur, $R_1$ represents a straight or branched chain lower alkyl group, preferably containing from 1 to 6 carbon atoms, and $R_2$ represents phenyl, thienyl, fluorenyl, biphenyl, xanthenyl, methoxy substituted phenyl, for example, 3,4,5-trimethoxyphenyl, chloro or bromo substituted phenyl, for example, 2-chlorophenyl, amino substituted phenyl, for example, 4-aminophenyl, chloro or bromo substituted fluorenyl, for example, 2,7-dibromofluorenyl, carboalkoxy substituted biphenyl, for example, 2'-carbethoxybiphenyl, styryl, phenylpropyl, methoxy ring substituted styryl, for example, 3,4,5-trimethoxystyryl, chloro or bromo ring substituted phenylethyl, for example, 4-bromophenylethyl, phenyl hydroxymethyl, 2-hydroxy-1-phenylethyl, chloro or bromo ring substituted phenyl hydroxymethyl, for example, 3-chlorophenyl hydroxymethyl, benzhydryl, 1,1-diphenylbutyl, methoxy ring substituted benzhydryl, for example, 4-methoxybenzhydryl, chloro or bromo ring substituted benzhydryl, for example, 4-chlorobenzhydryl, diphenyl hydroxymethyl, 2-hydroxy-1,1-diphenylethyl, methoxy ring substituted diphenyl hydroxymethyl, for example, bis(4-methoxyphenyl)hydroxymethyl, chloro or bromo ring substituted diphenyl hydroxymethyl, for example, phenyl 4-chlorophenyl hydroxymethyl, methyl ring substituted diphenyl hydroxymethyl, for example, phenyl 4-tolyl hydroxymethyl, chloro or bromo ring substituted 2-hydroxy-1,1-diphenylethyl, for example, 2-hydroxy-1,1-bis(4-bromophenyl)-ethyl, phenyl cyclohexylmethyl, methoxy ring substituted phenyl cyclohexylmethyl, for example, 4-methoxyphenyl cyclohexylmethyl, phenyl, cyclohexyl hydroxymethyl, 2-hydroxy-1-phenyl-1-cyclohexylethyl, methoxy ring substituted 2-hydroxy-1-phenyl-1-cyclohexylethyl, for example, 2-hydroxy-1-(4-methoxyphenyl) - 1 - cyclohexylethyl or chloro or bromo ring substituted phenyl cyclohexyl hydroxymethyl, for example, 2-bromophenyl cyclohexyl hydroxymethyl.

This invention also includes nontoxic salts of the above defined bases. Exemplary are salts formed with nontoxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well-known to the art.

Further exemplary of salts are nontoxic quaternary ammonium salts of the above defined bases formed with pharmacoligically acceptable organic esters of, for example, sulfuric, hydrohalic and aromatic sulfonic acids. These salts are prepared by treating a solution of the base in a suitable solvent such as chloroform, acetone, benzene, toluene or ether with an excess of an organic ester of sulfuric, hydrohalic or aromatic sulfonic acid. This reaction is carried out most advantageously at a temperature in the range of from about 25° C. to about 115° C. Exemplary of such esters are methyl chloride, methyl bromide, methyl iodide, ethyl chloride, propyl bromide, butyl chloride, isobutyl chloride, ethylene bromohydrin, ethylene chlorohydrin, allyl bromide, methallyl bromide, crotyl bromide, benzyl chloride, benzyl bromide naphthylmethyl chloride, penethyl bromide, dimethyl sulfate, diethyl sulfate, methyl benzene sulfonate and ethyl toluene sulfonate.

The compounds of this invention are prepared by the following sequence of reactions:

$$Z(CH_2CHO)_2 + R_1NH_2 + CO(CH_2CO_2H)_2 \longrightarrow$$

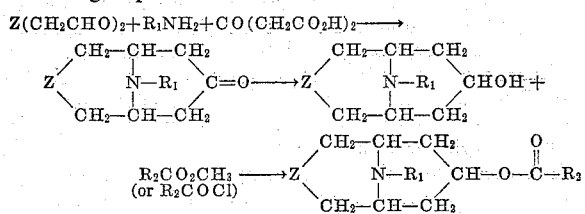

when Z, $R_1$ and $R_2$ are the same as defined above.

The dialdehyde is condensed with a lower alkyl primary amine, preferably in the form of an acid addition salt, such as the hydrochloride, and acetonedicarboxylic acid to form the corresponding 9-alkyl-3-oxa and 3-thia-9-azabicyclo[3.3.1]-nonan-7-ones. The reaction is carried out preferably at room temperature in an aqueous medium at about pH5. The thus formed carbonyl compounds are reduced by chemical or catalytic means, preferably hydrogenating employing Raney nickel in ethanol when Z is oxygen or with lithium aluminum hydride in ether when Z is oxygen or sulfur.

The resulting novel 9-alkyl-3-oxa and 3-thia-9-azabicyclo[3.3.1]-nonan-7-ol intermediates of this invention are represented by the following formula:

FORMULA 2

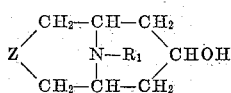

when:

Z represents oxygen or sulfur and $R_1$ represents a straight or branched chain lower alkyl group, preferably containing 1 to 6 carbon atoms. These compounds have utility for the preparation of the esters of this invention.

The intermediates of Formula 2 are esterified with a reactive derivative of a carboxylic acid such as a halide, preferably chloride or bromide, or an ester such as a lower alkyl ester, preferably the methyl or ethyl ester to give the compounds of Formula 1.

For example, an appropriately substituted acyl halide and a compound of Formula 2 are reacted in a suitable inert organic solvent such as benzene, toluene, xylene or a lower-carbon amide such as dimethylformamide, in which at least one of the reactants must be soluble. The reaction mixture is advantageously heated at from about 70 to 120° C. for from 5 to 10 hours. The foregoing method results in the formation of the hydrohalide salt of the desired ester.

Alternatively, a methyl or ethyl ester of a suitably substituted carboxylic acid and a compound of Formula 2 are reacted in the presence of sodium, either as the free metal or as an alkoxide derivative, such as sodium ethoxide, advantageously by heating at from about 100 to 150° C. under reduced pressure for a long period of time, preferably for from 20 to 40 hours. The desired product is isolated by cooling the reaction mixture and extracting with dilute acid, preferably dilute hydrochloric acid. The acid extracts are washed with ether, neutralized with dilute base and extracted with chloroform. The dried chloroform extracts are evaporated and the resulting residue purified, for example, by fractional distillation under high vacuum. In practice, the basic oil is usually dissolved in an organic solvent, such as acetone, ether or ethyl acetate, and converted into a salt by reacting the solution as described hereinbefore.

The foregoing is a general description of the utilization of the intermediate 9-alkyl-3-oxa and 3-thia-9-azabicyclo[3.3.1]-nonan-7-ols in the preparation of the novel esters of this invention.

It will be readily apparent to one skilled in the art that certain of the compounds of this invention may be present as steroisomers by virtue of the geometrical isomerism possible at $C_7$ in Formula 1 or by employing a carboxylic acid derivative in which $R_2$ contains an asymmetric carbon atom. The connotation of the general formulae presented herein is to include all isomers, including those having an α- or β-orientation at $C_7$ as well as the dl mixture of optical isomers. If desired, the mixture of optical isomers may be separated for individual use by separation methods known to the art, such as fractional crystallization, for instance, of the d-tartrate salts of the ester derivatives Alternatively, a synthesis starting with an optically active carboxylic acid derivative may yield the desired optical isomer.

The following examples are not limiting but are illustrative of compounds of this invention embraced by the general formulas given above and the procedures for their preparation as well as the utility of certain new intermediate compounds.

*Example 1*

Ten grams of oxybisacetal (B.P. 83 to 85° C. at 0.2 mm., prepared by reacting 25.0 g. of benzyloxyacetal with 4.65 g. of sodium under nitrogen in liquid ammonia and ether, and coupling the resulting debenzylated product with 20.8 g. of bromoacetal and 1.65 g. of sodium iodide in toluene) is hydrolyzed in 75 ml. of hot water containing a few drops of concentrated hydrochloric acid. The solution is cooled and filtered. The aqueous solution of oxydiacetaldehyde is stirred while 3.24 g. of methylamine hydrochloride and 8.75 g. of acetonedicarboxylic acid are added. The mixture is adjusted to pH 3.0 by the addition of potassium carbonate. Over a period of 15 hours, the pH is readjusted to 5.4–5.65 and then 4 ml. of concentrated hydrochloric acid is added. The clear solution is stirred for one hour, made basic with potassium carbonate to separate a solid and is extracted several times with chloroform. The combined organic extract is evaporated and the residue distilled to give an oil, B.P. 120 to 121° C. at 3.7 mm., which can be crystallized from ethyl ether to give a white crystalline solid, 9-methyl-3-oxa-9-azabicyclo-[3.3.1]-nonan-7-one, M.P. 76–78° C.

By reacting a portion of the oil with picric acid in ethanol solution, the picrate salt is obtained as fine needles, M.P. 284° C.

A suspension of 31.0 g. of 9-methyl-3-oxa-9-azabicyclo[3.3.1]-nonan-7-one and 5.0 g. of Raney nickel in 250 ml. of ethanol is hydrogenated at 30 to 63° C. and 900 p.s.i. The catalyst is removed by filtration and the filtrate is evaporated in vacuo. The solid residue thus obtained is recrystallized from petroleum ether to give 9-methyl-3-oxa-9-azabicyclo[3.3.1]-nonan-7-ol.

A mixture of 10.0 g. of 9-methyl-3-oxa-9-azabicyclo-[3.3.1]-nonan-7-ol, 33.2 g. of methyl benzilate and 0.25 g. of sodium is heated at 120 to 125° C. in a vacuum of 0.6 mm. for 30 hours. The cooled reaction mixture is extracted with 93.5 ml. of 10% hydrochloric acid solution. The acidic solution is washed with ether, neutralized and extracted with chloroform. Evaporation of the dried extract gives a glassy solid 9-methyl-3-oxa-9-azabicyclo[3.3.1]-nonan-7-yl-benzilate.

A solution of 10.0 g. of this oil in acetone is reacted with 3.48 g. of maleic acid to yield the maleate salt, M.P. 170–171° C.

Example 2

A solution of 1.04 g. of 9-methyl-3-oxa-9-azabicyclo-[3.3.1]-nonan-7-yl-benzilate from Example 1 in acetone is treated with methyl bromide to give the methobromide salt, M.P. 234–235° C. after recrystallization from acetonitrile.

Example 3

A suspension of 5.0 g. of 9-methyl-3-thia-9-azabicyclo-[3.3.1]-nonan-7-one (Journal of the Chemical Society, 1932, 2485), 1.22 g. of lithium aluminum hydride and 150 ml. of ether is reacted at reflux in a continuous extraction apparatus for six hours. The cooled reaction mixture is quenched with water. The ether extracts are dried and evaporated to an oily residue which crystallizes upon long standing to yield 9-methyl-3-thia-9-azabicyclo-[3.3.1]-nonan-7-ol.

A portion of this solid is reacted with methyl bromide in acetone solution to give the methobromide, M.P. 288–289° C.

A suspension of 5.0 g. of 9-methyl-3-thia-9-azabicyclo-[3.3.1]-nonan-7-ol, 8.67 g. of diphenylacetyl chloride and 40 ml. of dimethylformamide is heated at 80–90° C. for seven hours. The cooled mixture is diluted with ether and upon cooling the hydrochloride salt of 9-methyl-3-thia-9-azabicyclo[3.3.1]-nonan-7-yl-diphenylacetate, M.P. 232–233° C., is isolated.

Example 4

A mixture of 5.0 g. of 9-methyl-3-thia-9-azabicyclo-[3.3.1]-nonan-7-ol (prepared as in Example 3), 14.7 g. of methyl benzilate and 0.1 g. of sodium is heated at 130–135° C. under reduced pressure for 20 hours. After working up as in Example 1, 9-methyl-3-thia-9-azabicyclo-[3.3.1]-nonan-7-yl-benzilate is obtained as a glassy solid.

An ethereal solution of the free base is reacted with anhydrous hydrogen chloride gas to give the hydrochloride salt, M.P. 218–200° C.

Example 5

To a stirred solution of 11.8 g. of thiodiacetaldehyde in 100 ml. of water, 10.2 g. of ethylamine hydrochloride and 22.0 g. of acetonedicarboxylic acid are added, and the resulting mixture is adjusted to pH 3.0 by adding potassium carbonate. The pH is readjusted to approximately 5.5 over a period of 15 hours and then 9 ml. of concentrated hydrochloric acid is added. The solution is stirred for one hour, made basic with potassium carbonate and extracted with chloroform. The dried chloroform extract is evaporated in vacuo leaving a residual oil which vacuum distilled to give the product, 9-ethyl-3-thia-9-azabicyclo[3.3.1]-nonan-7-one.

A suspension of 9.3 g. of 9-ethyl-3-thia-9-azabicyclo-[3.3.1]-nonan-7-one, 1.9 g. of lithium aluminum hydride and 300 ml. of ether is reacted at reflux in a continuous extraction apparatus for six hours. The reaction mixture is treated with water and the dried ether extract is evaporated to give 9-ethyl-3-thia-9-azabicyclo[3.3.1]-nonan-7-ol.

A mixture of 3.7 g. of 9-ethyl-3-thia-9-azabicyclo-[3.3.1]-nonan-7-ol, 6.2 g. of ethyl cinnamate and 0.1 g. of sodium is heated under reduced pressure at 120 to 130° C. for 25 hours. The cooled reaction mixture is extracted with dilute hydrochloric acid and further treated as described in Example 1. Removal of the dried solvent from the organic extract yields 9-ethyl-3-thia-9-azabicyclo[3.3.1]-nonan-7-yl-cinnamate.

An ethereal solution of the free base is reacted with anhydrous hydrogen bromide gas to give the hydrobromide salt.

Example 6

A suspension of 6.3 g. of 9-methyl-3-oxa-9-azabicyclo-[3.3.1]-nonan-7-ol (prepared as in Example 1) and 7.0 g. of benzoyl chloride in 50 ml. of dimethylformamide is heated at 90 to 100° C. for eight hours. The mixture is cooled and diluted with ether. By further cooling the solution, 9-methyl-3-oxa-9-azabicyclo[3.3.1]-nonan-7-yl-benzoate hydrochloride is obtained.

Example 7

An aqueous solution of 5.1 g. of oxydiacetaldehyde (prepared as in Example 1) is stirred as 5.7 g. of isopropylamine hydrochloride and 10.2 g. of acetonedicarboxylic acid are added. The resulting mixture is then treated as outlined in Example 1 and the residual oil distilled under reduced pressure to give 9-isopropyl-3-oxa-9-azabicyclo[3.3.1]-nonan-7-one.

A suspension of 18.3 g. of 9-isopropyl-3-oxa-9-azabicyclo[3.3.1]-nonan-7-one and 2.5 g. of Raney nickel in 100 ml. of ethanol is hydrogenated at 40 to 60° C. and 900 p.s.i. The mixture is filtered and the filtrate is evaporated in vacuo to give a residue which may be recrystallized to yield 9-isopropyl-3-oxa-9-azabicyclo-[3.3.1]-nonan-7-ol.

A mixture of 5.6 g. of 9-isopropyl-3-oxa-9-azabicyclo-[3.3.1]-nonan-7-ol, 12.6 g. of methyl 3,4,5-trimethoxybenzoate and 0.1 g. of sodium is heated at 120 to 130° C. and 0.5 mm. for 30 hours. The mixture is then treated as in Example 1 to yield 9-isopropyl-3-oxa-9-azabicyclo-[3.3.1]-nonan-7-yl-3',4',5'-trimethoxybenzoate.

A solution of 1.0 g. of the free base in ether and an excess of methyl iodide is refluxed briefly and then cooled to give the methiodide salt.

Example 8

A mixture of 7.4 g. of 9-isopropyl-3-oxa-9-azabicyclo-[3.3.1]-nonan-7-ol (prepared as in Example 7), 12.0 g. of methyl mandelate and 0.15 g. of sodium is heated at 125 to 130° C. under reduced pressure for 25 hours. Working up the reaction mixture as described in Example 1 yields 9-isopropyl-3-oxa-9-azabicyclo[3.3.1]-nonan-7-yl-mandelate.

Reacting the free base with bismethylenesalicyclic acid in ethyl acetate solution furnishes the bismethylenesalicylate salt.

Example 9

To a solution of 5.9 g. of thiodiacetaldehyde in 50 ml. of water, 6.8 g. of butylamine hydrochloride and 11.0 g. of acetonedicarboxylic acid are added with stirring. The mixture is then treated and worked up as described in Example 5 to give 9-butyl-3-thia-9-azabicyclo[3.3.1]-nonan-7-one.

A suspension of 12.8 g. of 9-butyl-3-thia-9-azabicyclo [3.3.1]-nonan-7-one, 2.3 g. of lithium aluminum hydride and 350 ml. of ether is reacted at reflux in a continuous extraction apparatus for eight hours. Working up as outline in Example 5 yields 9-butyl-3-thia-9-azabicyclo [3.3.1]-nonan-7-ol.

A mixture of 4.3 g. of 9-butyl-3-thia-9-azabicyclo [3.3.1]-nonan-7-ol, 7.8 g. of methyl 4-chlorobenzilate and 0.1 g. of sodium is heated at 130 to 140° C. and 0.5 mm. for 25 hours. Upon working up as in Example 1, 9-butyl-3-thia-9-azabicyclo[3.3.1]-nonan-7-yl-4'-chlorobenzilate is obtained.

An acetone solution of the free base is reacted with ethyl chloride to yield the ethochloride quaternary salt.

Example 10

A suspension of 6.3 g. of 9-methyl-3-oxa-9-azabicyclo [3.3.1]-nonan-7-ol (prepared as in Example 1), 13.3 g. of 4-chlorophenyl phenylacetyl chloride and 50 ml. of dimethylformamide is heated at 100° C. for eight hours. Working up as in Example 3, 9-methyl-3-oxa-9-azabicyclo-[3.3.1]-nonan-7-yl-4'-chlorophenyl phenylacetate hydrochloride is isolated.

Example 11

An aqueous solution of 10.2 g. of oxydiacetaldehyde (prepared as in Example 1), 17.2 g. of hexylamine hydrochloride and 22.0 g. of acetonedicarboxylic acid is reacted as described in Example 1 to give 9-hexyl-3-oxa-9-azabicyclo-[3.3.1]-nonan-7-one.

A suspension of 9.0 g. of 9-hexyl-3-oxa-9-azabicyclo-[3.3.1]-nonan-7-one and 1.0 g. of Raney nickel in 75 ml. of ethanol is hydrogenated as specified in Example 1 to yield 9-hexyl-3-oxa-9-azabicyclo[3.3.1]-nonan-7-ol.

A suspension of 2.3 g. of 9-hexyl-3-oxa-9-azabicyclo-[3.3.1]-nonan-7-ol and 3.0 g. of phenyl cyclohexylacetyl chloride in 25 ml. of dimethylformamide is heated at 90 to 100° C. for eight hours, and worked up as in Example 3 to yield the hydrochloride of 9-hexyl-3-oxa-9-azabicyclo[3.3.1]-nonan-7-yl-phenyl cyclohexylacetate.

Example 12

A suspension of 13.6 g. of 9-hexyl-3-oxa-9-azabicyclo-[3.3.1]-nonan-7-ol (prepared as in Example 11) and 13.9 g. of 4-nitrobenzoyl chloride in 200 ml. of dimethylformamide is heated at 100 to 110° C. for eight hours. Working up the reaction mixture as described in Example 3 gives 9-hexyl-3-oxa-9-azabicyclo[3.3.1]-nonan-7-yl-4'-nitrobenzoate hydrochloride.

A suspension of 3.6 g. of the above nitro compound and 2.5 g. of Raney nickel in 100 ml. of ethanol is hydrogenated at 60° C. and 800 p.s.i. The catalyst is filtered off and the filtrate concentrated in vacuo. Subsequent cooling of the filtrate yields the desired product, 9 - hexyl - 3 - oxa - 9 - azabicyclo[3.3.1] - nonan - 7-yl-4'-aminobenzoate hydrochloride.

Example 13

A mixture of 9.2 g. of 9-isopropyl-3-oxa-9-azabicyclo-[3.3.1]-nonan-7-ol (prepared as in Example 7), 25.2 g. of methyl 3,4,5-trimethoxycinnamate and 0.2 g. of sodium is heated at 120 to 130° C. under reduced pressure for 25 hours. Working up the cooled reaction mixture as described in Example 1 yields 9-isopropyl-3-oxa-9-azabicyclo[3.3.1] - nonan - 7 - yl - 3',4',5' - trimethoxycinnamate.

A solution of 1.0 g. of the free base in benzene is heated at reflux for several hours with a slight excess of benzyl chloride. Cooling the mixture gives the benzyl quaternary ammonium chloride salt.

Example 14

A suspension of 4.5 g. of 9-hexyl-3-oxa-9-azabicyclo-[3.3.1]-nonan-7-ol (prepared as in Example 11) and 6.1 g. of xanthene-9-carboxylic acid chloride in 50 ml. of dimethylformamide is heated at 110 to 120° C. for eight hours. Treating the reaction mixture as in Example 3 yields 9-hexyl-3-oxa-9-azabicyclo[3.3.1]-nonan-7-yl-xanthene-9'-carboxylate hydrochloride.

Example 15

A mixture of 2.2 g. of 9-ethyl-3-thia-9-azabicyclo-[3.3.1]-nonan-7-ol hydrochloride (obtained by treating the free base prepared as in Example 5 with alcoholic hydrogen chloride) and a freshly prepared sample of acetyltropyl chloride (from the acetylation of 3.3 g. of tropic acid followed by treatment with thionyl chloride) is heated on the steam bath for four hours. The resulting oil is then heated with 20 ml. of water for 30 minutes and a cold solution of sodium hydroxide is added. An oil separates which is washed with cold water to give the product, 9-ethyl-3-thia-9-azabicyclo[3.3.1]-nonan-7-yl-tropate.

By reacting an ethereal solution of the free base with a saturated ether solution of fumaric acid, the fumarate salt is obtained.

Example 16

A suspension of 3.5 g. of 9-methyl-3-thia-9-azabicyclo-[3.3.1]-nonan-7-ol (prepared as in Example 3) and 5.7 g. of fluorene-9-carboxylic acid chloride in 30 ml. of dimethylformamide is heated at 90 to 100° C. for eight hours. Cooling the diluted reaction mixture as described in Example 3 yields the hydrochloride of 9-methyl-3-thia-9-azabicyclo[3.3.1]-nonan-7-yl-fluorene-9'-carboxylate.

Example 17

A mixture of 4.7 g. of 9-methyl-3-oxa-9-azabicyclo-[3.3.1]-nonan-7-ol (prepared as in Example 1), 13.9 g. of methyl α-phenyl-α-cyclohexylglycolate and 0.1 g. of sodium is heated at 125 to 135° C. under reduced pressure for 25 hours. Extracting the reaction mixture with dilute acid and working up as in Example 1 gives 9-methyl - 3 - oxa - azabicyclo[3.3.1] - nonan - 7 - yl - α-phenyl-α-cyclohexylglycolate.

Treating an acetone solution of the free base with dimethyl sulfate furnishes the corresponding quaternary salt.

Example 18

A suspension of 10.7 g. of 9-butyl-3-thia-9-azabicyclo-[3.3.1]-nonan-7-ol (prepared as in Example 9), 17.9 g. of 2-carbethoxybiphenyl-2'-carboxylic acid chloride (obtained from the monoethyl ester of 2,2'-dicarboxybiphenyl) and 100 ml. of dimethylformamide is heated at 110 to 120° C. for twelve hours. After working up the mixture as described in Example 3, 9-butyl-3-thia-9-azabicyclo[3.3.1] - nonan - 7 - yl - 2" - carbethoxybiphenyl-2'-carboxylate hydrochloride is obtained.

Example 19

A mixture of 9.4 g. of 9-methyl-3-oxa-9-azabicyclo-[3.3.1]-nonan-7-ol (prepared as in Example 1), 34.4 g. of methyl anisilate and 0.25 g. of sodium is heated at 120 to 125° C. in a vacuum of 0.6 mm. for 30 hours. Upon working up the reaction mixture as outlined in Example 1, 9-methyl-3-oxa-9-azabicyclo[3.3.1]-nonan-7-yl-anisilate is isolated.

An ethereal solution of the free base and methyl iodide is refluxed briefly and then cooled to give the methiodide salt.

Example 20

To a sample of α-cyclohexyl-acetyltropyl chloride (obtained from 4.0 g. of α-cyclohexyltropic acid, Chemical Abstracts, 48, 588i (1954), by acetylation and subsequent treatment with thionyl chloride) is added 1.8 g. of 9-ethyl-3-thia-9-azabicyclo[3.3.1]-nonan-7-ol hyrodchloride (perpared as described in Example 15) and the mixture is heated on the steam bath for four hours. A mixture of the oil and 25 ml. of water is heated for 30 minutes and a cold sodium hydroxide solution then added. An oil separates and is washed with cold water to yield 9-ethyl-3 - thia - 9 - azabicyclo[3.3.1] - nonan-7-yl-α-cyclohexyltropate.

Treating the free base with citric acid in ethyl acetate solution furnishes the citrate salt.

Example 21

A suspension of 3.8 g. of 9-isopropyl-3-oxa-9-azabicyclo [3.3.1]-nonan-7-ol (prepared as in Example 7) and 3.6 g. of 2-thiophenecarboxylic acid chloride in 50 ml. of dimethylformamide is heated at 80 to 100° C. for eight hours. The cooled reaction mixture is diluted with ether and upon further cooling, 9-isopropyl-3-oxa-9-azabicyclo [3.3.1] - nonan-7-yl-2'-thiophenecarboxylate hydrochloride is isolated.

Example 22

A suspension of 7.5 g. of 9-ethyl-3-thia-9-azabicyclo [3.3.1]-nonan-7-ol (prepared as in Example 5) and 8.7 g. of 2-chlorobenzoyl chloride in 75 ml. of dimethylformamide is heated at 90 to 100° C. for eight hours. Cooling the diluted reaction mixture as described in Example 3 yields 9 - ethyl-3-thia-9-azabicyclo[3.3.1]-nonan-7-yl-2'-chlorobenzoate hydrochloride.

Example 23

A mixture of 10.4 g. of 9-methyl-3-thia-9-azabicyclo[3.3.1]-nonan-7-ol (prepared as in Example 3), 24.0 g. of methyl 3-chloromandelate and 0.2 g. of sodium is heated at 120 to 125° C. under reduced pressure for 30 hours. Treating the reaction mixture as outlined in Example 1 gives 9-methyl-3-thia-9-azabicyclo[3.3.1]-nonan-7-yl-3'-chloromandelate.

A solution of the free base in acetone is reacted with maleic acid to yield the maleate salt.

Example 24

A suspension of 3.7 g. of 9-isopropyl-3-oxa-9-azabicyclo[3.3.1]-nonan-7-ol (prepared as in Example 7) and 9.7 g. of 2,7-dibromofluorene-9-carboxylic acid chloride in 50 ml. of dimethylformamide is heated at 95 to 100° C. for eight hours. Working up the reaction mixture as in Example 3 gives the hydrochloride of 9-isopropyl-3-oxa-9-azabicyclo[3.3.1]-nonan-7-yl-2',7'-dibromofluorene-9'-carboxylate.

Example 25

A mixture of 4.7 g. of 9-methyl-3-oxa-9-azabicyclo-[3.3.1]-nonan-7-ol (prepared as in Example 1), 8.0 g. of methyl γ-phenylbutyrate and 0.1 g. of sodium is heated at 120 to 130° C. in a vacuum of 0.6 mm. for 30 hours. By working up the reaction mixture as described in Example 1, 9 - methyl - 3-oxa-9-azabicyclo[3.3.1]-nonan-7-yl-γ-phenylbutyrate is obtained.

A solution of the free base and methyl iodide in ether is refluxed briefly and then cooled to furnish the methiodide salt.

Example 26

A suspension of 1.9 g. of 9-ethyl-3-thia-9-azabicyclo[3.3.1]-nonan-7-ol (prepared as in Example 5), 2.7 g. of 4-biphenylcarboxylic acid chloride and 30 ml. of dimethylformamide is heated at 120 to 125° C. for ten hours. Working up the mixture as described in Example 3 yields 9-ethyl-3-thia-9-azabicyclo[3.3.1]-nonan-7-yl-4'-biphenylcarboxylate hydrochloride.

Example 27

A mixture of 7.8 g. of 9-methyl-3-thia-9-azabicyclo-[3.3.1]-nonan-7-ol (prepared as in Example 3), 23.0 g. of methyl 4-methoxyphenyl phenylacetate and 0.1 g. of sodium is heated at 130 to 135° C. and 0.5 mm. for 20 hours. Upon working up as in Example 1, 9-methyl-3-thia - 9 - azabicyclo[3.3.1]-nonan-7-yl-4'-methoxyphenyl phenylacetate is isolated.

Treating an ethereal solution of the free base with a saturated solution of succinic acid in ether yields the succinate salt.

Example 28

A suspension of 10.7 g. of 9-butyl-3-thia-9-azabicyclo-[3.3.1]-nonan-7-ol (prepared as in Example 9) and 15.5 g. of 4-bromohydrocinnamoyl chloride in 75 ml. of dimethylformamide is heated at 90 to 100° C. for eight hours. Working up as in Example 3 yields the hydrochloride of 9-butyl-3-thia-9-azabicyclo[3.3.1]-nonan-7-yl-4'-bromohydrocinnamate.

Example 29

A suspension of 4.5 g. of 9-hexyl-3-oxa-9-azabicyclo-[3.3.1]-nonan-7-ol (prepared as in Example 11), 6.8 g. of 1,1-diphenylvaleryl chloride and 50 ml. of dimethylformamide is heated at 100° C. for eight hours. Upon working up the reaction mixture as described in Example 3, 9-hexyl-3-oxa-9-azabicyclo[3.3.1]-nonan-7-yl-1',1'-diphenylvalerate hydrochloride is obtained.

Example 30

A mixture of 4.7 g. of 9-methyl-3-oxa-9-azabicyclo-[3.3.1]-nonan-7-ol (prepared as in Example 1), 11.8 g. of methyl 4-methoxyphenyl cyclohexylacetate and 0.1 g. of sodium is heater at 120 to 130° C. under reduced pressure for 25 hours. Working up as described in Example 1 yields 9-methyl-3-oxa-9-azabicyclo[3.3.1]-nonan-7-yl-4'-methoxyphenyl cyclohexylacetate.

Treating an ethereal solution of the free base with methanesulfonic acid furnishes the methanesulfonate salt.

Example 31

A mixture of 9.4 g. of 9-methyl-3-oxa-9-azabicyclo-[3.3.1]-nonan-7-ol (prepared as in Example 1), 23.0 g. of methyl 4-methylbenzilate and 0.2 g. of sodium is heated at 125 to 130° C. under reduced pressure for 25 hours. Working up as in Example 1 yields 9-methyl-3-oxa-9-azabicyclo[3.3.1]-nonan-7-yl-4'-methylbenzilate.

An acetone solution of the free base is reacted with maleic acid to give the maleate salt.

Example 32

A mixture of 3.8 g. of 9-methyl-3-thia-9-azabicyclo-[3.3.1]-nonan-7-ol hydrochloride (obtained by reacting the free base prepared as in Example 3 with alcoholic hydrogen chloride) and a freshly prepared sample of α-phenyl-acetyltropyl chloride (from the acetylation of 8.7 g. of α-phenyltropic acid followed by treatment with thionyl chloride) is heated on the steam bath for four hours. The resulting oil is further treated as outlined in Example 15, after which the product, 9-methyl-3-thia-9-azabicyclo[3.3.1]-nonan-7-yl-α-phenyltropate is obtained.

Reacting a solution of the free base in ether with anhydrous hydrogen bromide gas yields the hydrobromide salt.

Example 33

A mixture of 5.6 g. of 9-isopropyl-3-oxa-9-azabicyclo[3.3.1]-nonan-7-ol (prepared as in Example 7), 15.4 g. of ethyl α-(2-bromophenyl)-α-cyclohexylglycolate (obtained from the addition of cyclohexyl magnesium bromide to ethyl 2-bromophenylglyoxylate as described in the Journal of the American Chemical Society, 71, 3772 (1949)) and 0.1 g. of sodium is heated at 120 to 130° C. under reduced pressure for 25 hours. The reaction mixture is extracted with dilute acid and worked up as in Example 1 to give 9-isopropyl-3-oxa-9-azabicyclo[3.3.1]-nonan-7-yl-α-(2-bromophenyl)-α-cyclohexylglycolate.

An acetone solution of the free base is treated with methyl bromide to yield the methobromide salt.

Example 34

Following the procedure outlined in the Journal of the American Chemical Society, 74, 1730 (1952), the chloromagnesium derivative of sodium cyclohexyl 4-methoxyphenylacetate is reacted with formaldehyde to give α-cyclohexyl-4-methoxytropic acid. A sample of this acid (5.5 g.) is acetylated, treated with thionyl chloride and the resulting α-cyclohexyl-4-methoxy-acetyltropyl chloride is heated with 2.5 g. of 9-butyl-3-thia-9-azabicyclo[3.3.1]-nonan-7-ol hydrochloride (obtained by treating the free base prepared as in Example 9 with alcoholic hydrogen chloride) on the steam bath for six hours. The reaction mixture is worked up as described in Example 15 to yield 9-butyl-3-thia-9-azabicyclo-[3.3.1]-nonan-7-yl-α-cyclohexyl-4'-methoxytropate.

An ethereal solution of the free base and a slight excess of methyl iodide is refluxed briefly on the steam bath. Cooling the solution gives the methiodide salt.

Example 35

The chloromagnesium derivative of sodium bis(4-bromophenyl)acetate is reacted with formaldehyde (Journal of the American Chemical Society, 74, 1730 (1952)) to give α-(4-bromophenyl)-4-bromotropic acid. A freshly prepared sample of α-(4-bromophenyl)-4-bromo-acetyltropyl chloride [obtained from 24.0 g. of α-(4-bromophenyl)-4-bromotropic acid by acetylation and subsequent treatment with thionyl chloride] is added to 5.8 g. of 9-methyl-3-oxa-9-azabicyclo[3.3.1]-nonan-7-ol hydrochloride (obtained by treating the free base prepared as in Example 1 with alcoholic hydrogen chloride) and the mixture is heated on the steam bath for six hours. Working up the reaction mixture as described in Example 15 yields 9-methyl-3-oxa-9-azabicyclo[3.3.1]-nonan-7-yl-α-(4-bromophenyl)-4′-bromotropate.

A solution of the free base in acetone is reacted with benzoic acid to give the benzoate salt.

What is claimed is:

1. Chemical compounds having the following structural formula:

$$Z\begin{matrix} CH_2-CH-CH_2 \\ N-R_1 \\ CH_2-CH-CH_2 \end{matrix} CHOH$$

in which Z is a member selected from the group consisting of oxygen and sulfur and $R_1$ is a lower alkyl group.

2. A chemical compound having the structural formula:

$$O\begin{matrix} CH_2-CH-CH_2 \\ N-CH_3 \\ CH_2-CH-CH_2 \end{matrix} CH-O-C-C(OH)(C_6H_5)_2 \\ \parallel \\ O$$

3. A chemical compound having the structural formula:

$$S\begin{matrix} CH_2-CH-CH_2 \\ N-CH_3 \\ CH_2-CH-CH_2 \end{matrix} CH-O-C-CH(C_6H_5)_2 \\ \parallel \\ O$$

4. A chemical compound having the structural formula:

$$S\begin{matrix} CH_2-CH-CH_2 \\ N-CH_3 \\ CH_2-CH-CH_2 \end{matrix} CH-O-C-C(OH)(C_6H_5)_2 \\ \parallel \\ O$$

5. A chemical compound having the structural formula:

$$O\begin{matrix} CH_2-CH-CH_2 \\ N-CH_3 \\ CH_2-CH-CH_2 \end{matrix} CH-O-C-CH(C_6H_5)(C_6H_4Cl) \\ \parallel \\ O$$

6. A chemical compound having the structural formula:

$$S\begin{matrix} CH_2-CH-CH_2 \\ N-CH_3 \\ CH_2-CH-CH_2 \end{matrix} CH-O-C-C(OH)(C_6H_5)(C_6H_{11}) \\ \parallel \\ O$$

7. A chemical compound having the structural formula:

$$O\begin{matrix} CH_2-CH-CH_2 \\ N-CH_3 \\ CH_2-CH-CH_2 \end{matrix} CH-O-C-C(OH)(C_6H_5)(C_6H_4CH_3) \\ \parallel \\ O$$

8. A chemical compound having the structure formula:

$$O\begin{matrix} CH_2-CH-CH_2 \\ N-CH_3 \\ CH_2-CH-CH_2 \end{matrix} CHOH$$

9. A chemical compound having the structural formula:

$$S\begin{matrix} CH_2-CH-CH_2 \\ N-CH_3 \\ CH_2-CH-CH_2 \end{matrix} CHOH$$

10. Chemical compounds of the class consisting of a free base and the nontoxic, pharmacologically acceptable acid addition and quaternary ammonium salts thereof, the free base having the following structural formula:

$$Z\begin{matrix} CH_2-CH-CH_2 \\ N-R_1 \\ CH_2-CH-CH_2 \end{matrix} CH-O-C-R_2 \\ \parallel \\ O$$

in which Z is a member selected from the group consisting of oxygen and sulfur; $R_1$ is a lower alkyl group; and $R_2$ is a member selected from the group consisting of phenyl; thienyl; fluorenyl; biphenyl; xanthenyl; methoxy substituted phenyl; mono halogen substituted phenyl; mono amino substituted phenyl; 2,7-dibromofluorenyl; mono carboalkoxy substituted biphenyl, the carboalkoxy moiety having 2 to 3 carbons; phenylalkyl, methoxy ring substituted phenylalkyl, mono halogen ring substituted phenylalkyl, each of the said phenylalkyl moieties having 7 to 10 carbon atoms; phenyl hydroxyalkyl, mono halogen ring substituted phenyl hydroxyalkyl, each of the said phenyl hydroxyalkyl moieties having 7 to 10 carbon atoms; diphenylalkyl, methoxy ring substituted diphenylalkyl, mono halogen ring substituted diphenylalkyl, each of the said diphenylalkyl moieties having 13 to 16 carbon atoms; diphenyl hydroxyalkyl, methoxy ring substituted diphenyl hydroxyalkyl, mono halogen ring substituted diphenyl hydroxyalkyl, mono methyl ring substituted diphenyl hydroxyalkyl, each of the said diphenyl hydroxyalkyl moieties having 13 to 16 carbon atoms; phenyl cyclohexylmethyl; phenyl cyclohexylmethyl with the phenyl moiety methoxy substituted; and phenyl cyclohexyl hydroxyalkyl, phenyl cyclohexyl hydroxyalkyl with the phenyl moiety methoxy substituted, phenyl cyclohexyl hydroxyalkyl with the phenyl moiety mono halogen substituted, each of the said phenyl cyclohexyl hydroxyalkyl moieties having 13 to 16 carbon atoms.

References Cited in the file of this patent

UNITED STATES PATENTS

| 2,366,760 | Van der Camp et al. | Jan. 9, 1945 |
| 2,800,476 | Stoll et al. | July 23, 1957 |
| 2,804,460 | Cavallito et al. | Aug. 27, 1957 |
| 2,814,623 | Moffett | Nov. 26, 1957 |

OTHER REFERENCES

Blount et al.: J. Chem. Soc. (London), vol. 1932, pp. 2485–7.